United States Patent
Paine et al.

(10) Patent No.: US 9,941,779 B2
(45) Date of Patent: Apr. 10, 2018

(54) LINEAR OR ROTARY ACTUATOR USING ELECTROMAGNETIC DRIVEN HAMMER AS PRIME MOVER

(71) Applicants: Jeffrey S. N. Paine, Franklin, TN (US); Byron F. Smith, Cordova, TN (US); Joshua J. Sesler, Franklin, TN (US); Matthew T. Paine, Franklin, TN (US); Bert K. McMahan, Brentwood, TN (US); Mark C. McMahan, Nashville, TN (US)

(72) Inventors: Jeffrey S. N. Paine, Franklin, TN (US); Byron F. Smith, Cordova, TN (US); Joshua J. Sesler, Franklin, TN (US); Matthew T. Paine, Franklin, TN (US); Bert K. McMahan, Brentwood, TN (US); Mark C. McMahan, Nashville, TN (US)

(73) Assignee: Dynamic Structures and Materials, LLC, Franklin, TN (US)

( * ) Notice: Subject to any disclaimer, the term of this patent is extended or adjusted under 35 U.S.C. 154(b) by 63 days.

(21) Appl. No.: 14/707,177

(22) Filed: May 8, 2015

(65) Prior Publication Data

US 2016/0327137 A1    Nov. 10, 2016

(51) Int. Cl.
*F16H 33/00* (2006.01)
*H02K 41/035* (2006.01)

(52) U.S. Cl.
CPC ..... *H02K 41/0356* (2013.01); *H02K 41/0358* (2013.01)

(58) Field of Classification Search
CPC ...... F16H 19/001; F16H 19/02; F16H 19/025; H02K 41/0356; H02K 41/0358
See application file for complete search history.

(56) References Cited

U.S. PATENT DOCUMENTS 2,284,679 A * 6/1942 Potts .................. H04L 17/08
                                                    178/4
2,554,005 A * 5/1951 Bodine, Jr. ............... E21B 7/24
                                                    173/49

(Continued)

OTHER PUBLICATIONS

A. Morcos, "Latest Developments in voice coil actuators," BEI, Oct. 1, 2000. [Online]. Available: http://machinedesign.com/linear-motion/latest-developments-voice-coil-actuators.

(Continued)

*Primary Examiner* — Zakaria Elahmadi
(74) *Attorney, Agent, or Firm* — Lodestone Legal Group; Jeromye V. Sartain

(57) ABSTRACT

We claim a hammer driven actuator that uses the fast-motion, low-force characteristics of an electro-magnetic or similar prime mover to develop kinetic energy that can be transformed via a friction interface to produce a higher-force, lower-speed linear or rotary actuator by using a hammering process to produce a series of individual steps. Such a system can be implemented using a voice-coil, electro-mechanical solenoid or similar prime mover. Where a typical actuator provides limited range of motion or low force, the range of motion of a linear or rotary impact driven motor can be configured to provide large displacements which are not limited by the characteristic dimensions of the prime mover.

15 Claims, 2 Drawing Sheets

(56) References Cited

U.S. PATENT DOCUMENTS

| | | | | | |
|---|---|---|---|---|---|
| 2,717,763 | A | * | 9/1955 | Bodine, Jr. | E21B 4/06 116/137 A |
| 2,930,244 | A | * | 3/1960 | Hutchinson | B06B 1/162 74/61 |
| 3,012,654 | A | * | 12/1961 | Allen | B65G 27/20 198/770 |
| 3,413,578 | A | * | 11/1968 | Dennison | H01H 3/022 335/167 |
| 3,922,869 | A | * | 12/1975 | Wisotsky | E02D 7/00 405/228 |
| 7,040,481 | B1 | * | 5/2006 | Sommerhalter, Jr. | H02K 41/03 104/290 |
| 7,270,025 | B2 | * | 9/2007 | Niglov | B06B 1/166 74/61 |
| 2007/0272043 | A1 | * | 11/2007 | O'Connor | B06B 1/161 74/61 |
| 2008/0297074 | A1 | * | 12/2008 | Sheahen, Jr. | H02K 21/14 318/115 |
| 2010/0016827 | A1 | * | 1/2010 | Hunter | A61M 5/30 604/500 |
| 2010/0147090 | A1 | * | 6/2010 | Kuerten | B06B 1/166 74/61 |
| 2011/0290048 | A1 | * | 12/2011 | Stein | E01C 19/286 74/61 |
| 2012/0055276 | A1 | * | 3/2012 | Wagner | B06B 1/162 74/61 |
| 2013/0237930 | A1 | * | 9/2013 | Mulvihill | A61M 25/00 604/264 |
| 2013/0316624 | A1 | * | 11/2013 | Diehl | B24B 13/0055 451/246 |
| 2014/0238226 | A1 | * | 8/2014 | Kim | F01C 9/002 92/2 |
| 2014/0305234 | A1 | * | 10/2014 | Kleibl | B06B 1/161 74/61 |
| 2014/0305235 | A1 | * | 10/2014 | Kleibl | B06B 1/161 74/61 |
| 2014/0305236 | A1 | * | 10/2014 | Kleibl | B06B 1/161 74/61 |
| 2016/0331645 | A1 | * | 11/2016 | Bagwell | A61J 15/0026 |

OTHER PUBLICATIONS

T. Morcos, "The Straight Attraction," Motion Control, pp. 29-33, 2000.

N. &. T. X. Wavre, "Voice-coil actuators in space," Sixth European Space Mechanisms and Tribology Symposium, Proceedings of the conference held Oct. 4-6, 1995 in Zürich, Switzerland. Edited by W.R. Burke. ESA SP-374. European Space Agency, p. 227, 1995.

\* cited by examiner

LINEAR OR ROTARY ACTUATOR USING ELECTROMAGNETIC DRIVEN HAMMER AS PRIME MOVER

This invention was made with government support under contract NNX12CE83P awarded by NASA. The government has certain rights in the invention.

CROSS REFERENCE TO RELATED APPLICATIONS

Not applicable

BACKGROUND OF THE INVENTION

Linear and rotary actuators are fundamental to virtually all industrial processing applications. Many advanced industrial and scientific processes involve extreme environments which are not ideal for traditional linear or rotary actuators. Extreme heat or cold, for example, may weaken rubber seals, jam gearboxes, or thicken lubricants. To date, very few actuators provide high force output without tight seals, gears, or lubrication. The proposed invention offers a compact, high force, and potentially non-grounded actuation system by use of an inertial hammering motion to significantly extend the displacement and force capabilities of a prime mover. The field of this invention is the field of actuator design. More specifically, the invention relates to the field of electro-mechanical motors used to produce actuators for industrial automation, flow control, valves, and motion control in general mechanical and industrial applications.

BRIEF DESCRIPTION OF PRIOR ART

Construction Field—Pile Drivers

The pile driver is used in the field of civil construction using a similar mechanical impact action where the advancement of a shaft structure is dependent on an impact or hammer drive. Quoted from Wikipedia.org.

"A pile driver is a mechanical device used to drive piles (poles) into soil to provide foundation support for buildings or other structures . . . . One traditional type of pile driver includes a heavy weight placed between guides so that it is able to freely slide up and down in a single line. It is placed upon a pile. The weight is raised, which may involve the use of hydraulics, steam, diesel, or manual labour. When the weight reaches its highest point it is then released and smashes on to the pile in order to drive it into the ground" Quoted from http://en.wikipedia.org/wiki/Pile_driver The construction field pile driver is not guided via a friction interface and does not make impacts in both directions.

Piezoelectric Inertial Slip or Stick Slip Motors

The field of piezoelectric actuators has presented a number of stick-slip and impact drive architectures. In the stick-slip (aka inertial-slip) architecture, the small amplitude high-bandwidth motion of piezoelectric element is used to provide "stepping mode" and/or "sliding mode" movement control of a "slider". In stepping mode, the slider is advanced by the piezoelectric element—in a relatively slow movement, or "slow move", where inertia prevents relative motion between the slider and a friction interface. In the "sliding mode" move, relative motion of the slider point of contact is initiated by executing a "fast move" with the piezoelectric element. During this fast move, the inertia of the slider prevents it from following the motion of the piezoelectric element and the acceleration of the point of contact mass overcomes the friction. By executing several slow move/fast move cycles, the small motion of the piezo-element can be used to generate relatively large displacements of the slider one "step" at a time. When finer control is needed, a lower amplitude slow move can be used to provide sub-step resolution.

Much like piezoelectric stick-slip motors, voice-coil actuators typically try to minimize the inertia associated with the moving elements in the actuator. This provides better response time and control over the limited working range of the actuator. While a number of actuation methods have been used to produce impact or hammer drives, to date, a voice-coil or inductive based system has not been presented in the literature or disclosed in patent filings [1, 2, 3] in the described configurations.

BRIEF SUMMARY OF THE INVENTION

A hammer driven actuator uses the high-speed, low-force characteristics of an electro-mechanical or pneumatic prime mover to develop kinetic energy that is transformed through an impact or impulse to an output to produce a higher force, lower speed, linear or rotary actuator with displacement and force characteristics that exceed the prime mover's capabilities. Where displacement and force capabilities of typical electro-mechanical and pneumatic actuators are limited by prime mover characteristics, the impact driven linear or rotary impact driven actuator can be configured to provide large displacements and higher forces not limited by the characteristic dimensions of the electro-mechanical prime mover.

DETAILED DESCRIPTION OF THE INVENTION

General Description of the Preferred Embodiment

Figure 1:
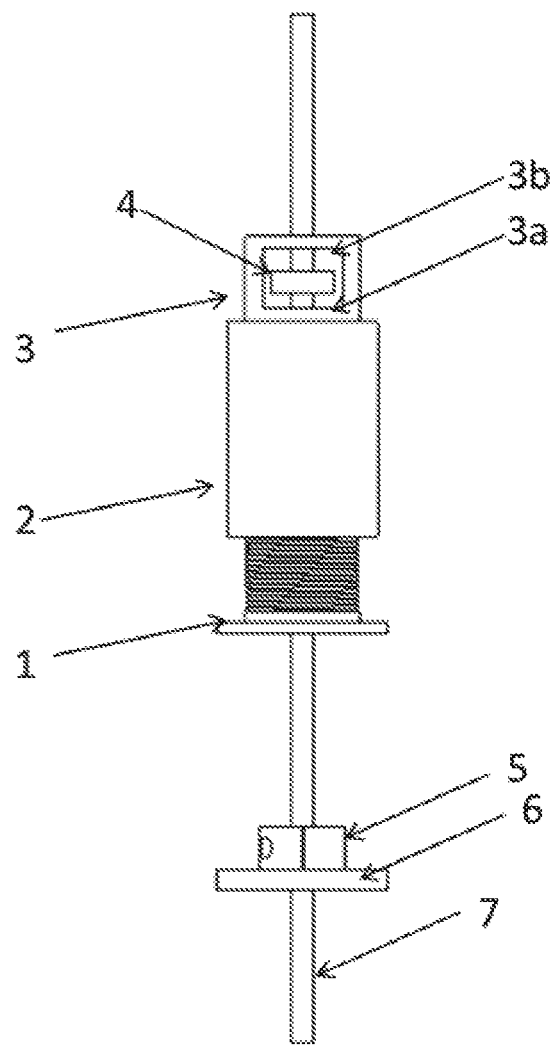
FIG. 1 is a side schematic view showing a linear voice coil actuator attached to an output shaft, along with a box frame structure around an impact collar.

A preferred embodiment of the present invention, as shown in FIG. 1, consists of a voice-coil prime mover that includes a winding (1) and a permanent magnet assembly (2). The permanent magnet assembly (2) is fixed to a box frame hammer structure (3). The magnet assembly (2) may have additional weight attached to increase its inertial mass. The winding (1) and an impact collar (4) are rigidly attached to an output shaft (7). The output shaft (7) is guided by a mounting flange (6) via a friction interface (5) which may also be considered a friction bushing. As current is applied to the winding (1), the permanent magnet assembly (2) and attached box frame hammer (3) are accelerated until the box frame hammer (3) strikes the impact collar (4). Kinetic energy of the permanent magnet assembly (2) and box frame hammer (3) is transferred to the impact collar (4). When the resulting impact force is sufficient to overcome the friction force provided by the friction interface (5), relative motion of the output shaft (7) is generated. In FIG. 1, the permanent magnet assembly (2) can be moved upward, driving the box frame structure (3) upward into the shaft collar (4), impacting the shaft collar with the lower face of the box frame hammer structure (3a). The upward kinetic energy of the magnet assembly (2) and box frame hammer structure are transferred to the output shaft (7) via the impact collar (4). This sharp hammer impact creates motion by causing the output shaft (7) to slip through the friction interface (5). Motion in the reverse direction is accomplished by rapidly driving the hammer structure (3) from the top position to the bottom position, impacting the shaft collar with the upper surface of the box frame structure (3b), causing downward motion.

Figure 2A:
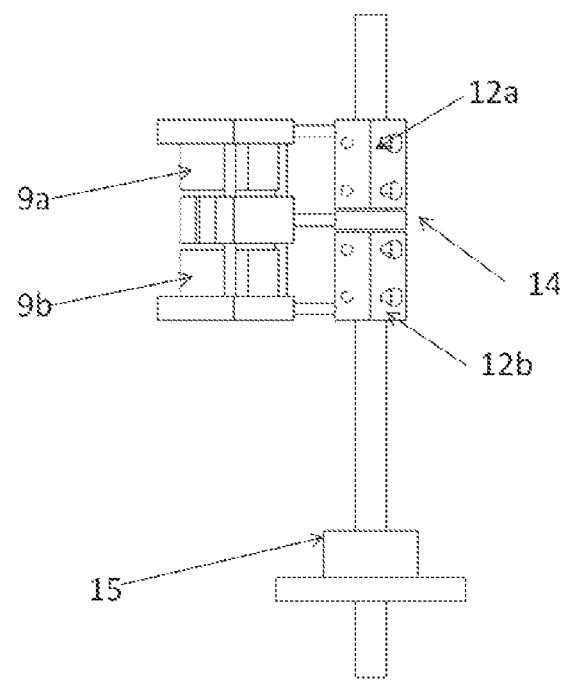
FIGS. 2A and 2B are side and perspective schematic views, respectively, showing a rotary voice coil actuator attached to an output shaft that operates in a manner analogous to the linear voice coil actuator of FIG. 1, but with a rotary output.
Figure 2B:
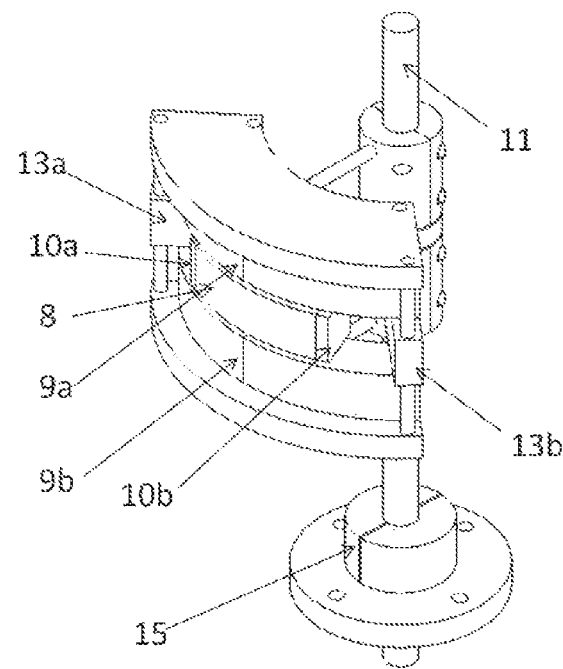

An alternative embodiment is given by the rotary voice-coil prime mover impact drive (FIGS. 2A and 2B). As can be seen in the figures, this embodiment contains a winding (8) that can be used to generate an electromagnet, which is attached to an output shaft (11) with a free-spinning bearing or bushing (14), a set of permanent magnets (9a and 9b) attached to the output shaft (11) by rigid clamps (12a and 12b), a set of hammer pads (10a and 10b) attached to the winding (8), a set of impact plates (13a and 13b), and a friction interface (15). The winding (8) may have additional mass attached in order to generate higher impact energy. An electrical signal can be sent to the winding (8) in order to cause relative displacement with respect to the permanent magnets (9a and 9b). As the winding (8) moves it gains kinetic energy which is then transferred to one of the impact plates (13a or 13b) as it strikes the plate. This impact force is resisted by the static friction force developed by the friction interface (15). The permanent magnets and impact plates are mounted on a common assembly that is rigidly attached to the output shaft. When the impact force overcomes the static friction force provided by the friction interfaces, the output shaft (11) is displaced relative to the friction interface (15). The winding and hammer pads are incorporated into a second assembly which is mounted on a bearing (14) that allows them to rotate freely about the center shaft (11).

General Description of the Overall Technology:

The invention can be applied to a family of relatively limited stroke electromagnetic actuators to be used as prime movers for a hammer drive to produce displacements in excess of the characteristic displacement found in the prime mover. Similarly, the characteristic force output of the prime mover can be amplified to produce significantly higher output forces through the use of a hammer driven operating configuration. An example of this conversion is as follows. A 0.6" displacement, 16 pound capable voice-coil was set up in a hammer driven actuator embodiment. The voice coil was set up to drive the impact hammer. The resulting hammer driven actuator produced up to 100 pounds of force and 2 inches of displacement. The displacement can be increased based on additional guidance and bearings.

Additional embodiments use any type of relatively limited stroke rotary or linear actuator to produce the relatively high kinetic energy of the hammer structure to strike against the impact collar. Relatively limited linear and rotary actuators might include:
   inductive solenoids,
   moving coil voice-coils instead of moving magnet voice coils described previously,
   traction motors using Brushless or AC induction technology,
   electrostatic actuators, and/or
   other electromechanical limited stroke actuators that can achieve high kinetic energy.

Additional embodiments include applications in which the friction clamp is part of the output device itself. For example, a gate valve has an innate friction required to close the valve. This actuator would be able to mount to the gate valve input without requiring a separate friction interface; the output load itself would act as the friction interface.

Additional embodiments use any type of pneumatic limited stroke rotary or linear actuator to produce the high kinetic energy hammer strike against the impact collar (or other impact feature). A pneumatic device with limited stroke could be used either with or without a biasing or return spring to generate the aforementioned impacts.

Additional embodiments include different kinetic impact absorption geometries. The description above, as well as FIG. 1, shows a box frame hammer structure. Other potential geometries include:
   Simple collars attached to, or constructed as a part of, the output shaft, such that vertical motion would impact a shaft collar placed above or below the hammer mechanism (instead of an enclosed box frame)
   A version of any of the above types, but with one impact surface being the mounting structure of the prime mover itself. For example, a voice coil may bottom out in one direction, allowing that to be one half of the impact interface. The other end may be a shaft collar or similar.
   A version of the above types, but with the impact geometries internal to the prime mover instead of mounted externally.
   A version of the above types with the magnet and coil in reversed positions.

REFERENCES

[1] A. Morcos, "Latest Developments in voice coil actuators," BEI, 1 Oct. 2000. [Online]. Available: http://machinedesign.com/linear-motion/latest-developments-voice-coil-actuators. [Accessed 20 Aug. 2013].
[2] T. Morcos, "The Stright Attraction," *Motion Control*, pp. 29-33, 2000.
[3] N. &. T. X. Wavre, "Voice-coil actuators in space," *Sixth European Space Mechanisms and Tribology Symposium, Proceedings of the conference held 4-6 Oct. 1995 in Zürich, Switzerland. Edited by W. R. Burke. ESA SP-374. European Space Agency*, p. 227, 1995.

We claim:

1. An actuator comprised of:
   an output shaft (7, 11);
   an impact collar (4) attached to the output shaft (7, 11);
   a friction interface (5, 15) connected frictionally to the output shaft (7, 11); and
   a prime mover operably engaged with the output shaft (7, 11), the prime mover comprised of a winding (1, 8) and a permanent magnet assembly (2, 9a, 9b) positioned adjacent to the winding (1, 8), one of the winding (1, 8) and the permanent magnet assembly (2, 9a, 9b) being attached to the output shaft (7, 11), wherein movement of the winding (1, 8) relative to the permanent magnet assembly (2, 9a, 9b) causes movement of the output shaft (7, 11) relative to the friction interface (5, 15); and
   wherein:
   the prime mover further comprises a box frame hammer (3) attached to the permanent magnet assembly (2, 9a, 9b), the box frame hammer (3) having opposing lower and upper faces (3a, 3b); and the impact collar (4) is attached to the output shaft (7, 11) substantially between the lower and upper faces (3a, 3b) of the box frame hammer (3), whereby movement of the permanent magnet assembly (2, 9a, 9b) relative to the winding (1, 8) causes the box frame hammer (3) to impact the impact collar (4) and impart kinetic energy from the permanent magnet assembly (2, 9a, 9b) to the impact collar (4) and thus shift the output shaft (7, 11) relative to the friction interface (5, 15).

2. The actuator of claim 1 configured having a linear output, and wherein the prime mover is oriented such that the winding (1, 8) and the permanent magnet assembly (2, 9a, 9b) are approximately parallel to the output shaft (7, 11).

3. The actuator of claim 1 configured having a linear output, and wherein the prime mover has a limited stroke to impart kinetic energy to the output shaft (7, 11).

4. The actuator of claim 1 configured having a rotary output, and wherein the prime mover is oriented such that one of the winding (1, 8) and the permanent magnet assembly (2, 9a, 9b) are rotational around the output shaft (7, 11).

5. The actuator of claim 2, 3, or 4 wherein the winding (1, 8) is attached to the output shaft (7, 11) and so defines the output of the prime mover, and wherein the permanent magnet assembly (2, 9a, 9b) moves relative to the winding (1, 8) and the output shaft (7, 11).

6. The actuator of claim 2, 3, or 4 wherein the permanent magnet assembly (2, 9a, 9b) is attached to the output shaft (7, 11) and so defines the output of the prime mover, and wherein the winding (1, 8) moves relative to the permanent magnet assembly (2, 9a, 9b) and the output shaft (7, 11).

7. The actuator of claim 1 wherein the prime mover is selected from the group consisting of a voice coil actuator, a solenoid actuator, an electrostatic actuator, an AC induction actuator, a pneumatic piston device, and a hydraulic actuator.

8. The actuator of claim 1 wherein one of the winding (1, 8) and the permanent magnet assembly (2, 9a, 9b) comprises additional inertial mass.

9. An actuator comprised of:
an output shaft (7) having an impact collar (4) attached thereon;
a friction interface (5) connected frictionally to the output shaft (7); and
a linear prime mover operably engaged with the output shaft (7), the prime mover comprised of a winding (1) and a permanent magnet assembly (2) positioned adjacent to the winding (1), the winding (1) being attached to the output shaft (7), wherein movement of the permanent magnet assembly (2) relative to the winding (1) impacts the impact collar (4) and thus shifts the output shaft (7) relative to the friction interface (5); and wherein:
the prime mover further comprises a box frame hammer (3) attached to the permanent magnet assembly (2), the box frame hammer (3) having opposing lower and upper faces (3a, 3b); and the impact collar (4) is attached to the output shaft (7) substantially between the lower and upper faces (3a, 3b) of the box frame hammer (3), whereby movement of the permanent magnet assembly (2) relative to the winding (1) causes the box frame hammer (3) to impact the impact collar (4) and impart kinetic energy from the permanent magnet assembly (2) to the impact collar (4) so as to shift the output shaft (7) relative to the friction interface (5).

10. An actuator comprised of:
an output shaft (11);
a friction interface (15) connected frictionally to the output shaft (11); and
a prime mover operably engaged with the output shaft (11), the prime mover comprised of a winding (8) and a permanent magnet assembly positioned adjacent to the winding (8), the permanent magnet assembly comprising a set of spaced-apart permanent magnets (9a, 9b) attached to the output shaft (11) by rigid clamps (12a, 12b), and the winding (8) installed on the output shaft (11) between the spaced-apart permanent magnets (9a, 9b) via a bearing (14) so as to allow relative movement between the winding (8) and the output shaft (11), wherein movement of the winding (8) relative to the permanent magnet assembly impacts one of the spaced-apart permanent magnets (9a, 9b) and thus shifts the output shaft (11) relative to the friction interface (15); and wherein:
opposing impact plates (13a, 13b) are formed on the respective spaced-apart permanent magnets (9a, 9b); and
opposite hammer pads (10a, 10b) are formed on the winding (8) and configured for selectively impacting the respective opposing impact plates (13a, 13b) so as to impart kinetic energy from the winding (8) to the permanent magnet assembly and thereby shift the output shaft (11) relative to the friction interface (15).

11. The actuator of claim 10 wherein the prime mover is oriented such that the winding (8) and the spaced-apart permanent magnets (9a, 9b) are offset from the output shaft (11).

12. The actuator of claim 10 configured having a linear output, and wherein the prime mover has a limited stroke to impart kinetic energy to the output shaft (11).

13. The actuator of claim 10 configured having a rotary output, and wherein the prime mover is oriented such that one of the winding (8) and the spaced-apart permanent magnets (9a, 9b) are rotational around the output shaft (11).

14. The actuator of claim 10 wherein the prime mover is selected from the group consisting of a voice coil actuator, a solenoid actuator, an electrostatic actuator, an AC induction actuator, a pneumatic piston device, and a hydraulic actuator.

15. The actuator of claim 10 wherein one of the winding (8) and the spaced-apart permanent magnets (9a, 9b) comprises additional inertial mass.

* * * * *